(12) United States Patent
Komatsu et al.

(10) Patent No.: US 12,060,173 B2
(45) Date of Patent: Aug. 13, 2024

(54) AERIAL VEHICLE WITH MAGNETIC FIELD POWER GENERATION UNIT AND TOWER INCLUDING CHARGING PORT

(71) Applicant: INTERNATIONAL FRONTIER TECHNOLOGY LABORATORY, INC., Tokyo (JP)

(72) Inventors: Nobuaki Komatsu, Tokyo (JP); Tomoko Ito, Tokyo (JP)

(73) Assignee: International Frontier Technology Laboratory, Inc., Tokyo (JP)

( * ) Notice: Subject to any disclaimer, the term of this patent is extended or adjusted under 35 U.S.C. 154(b) by 174 days.

(21) Appl. No.: 17/783,665

(22) PCT Filed: Dec. 8, 2020

(86) PCT No.: PCT/JP2020/045709
§ 371 (c)(1),
(2) Date: Jun. 9, 2022

(87) PCT Pub. No.: WO2021/117730
PCT Pub. Date: Jun. 17, 2021

(65) Prior Publication Data
US 2023/0026256 A1    Jan. 26, 2023

(30) Foreign Application Priority Data
Dec. 9, 2019   (JP) .................. 2019-222232

(51) Int. Cl.
*B64U 50/35*    (2023.01)
*B64U 50/19*    (2023.01)
*B64U 101/00*   (2023.01)

(52) U.S. Cl.
CPC .............. *B64U 50/35* (2023.01); *B64U 50/19* (2023.01); *B64U 2101/00* (2023.01)

(58) Field of Classification Search
CPC .................................................... B64U 50/35
See application file for complete search history.

(56) References Cited

U.S. PATENT DOCUMENTS

| | | | |
|---|---|---|---|
| 4,818,990 A * | 4/1989 | Fernandes | G05D 1/0038 |
| | | | 340/310.17 |
| 7,398,946 B1 * | 7/2008 | Marshall | B64D 27/24 |
| | | | 244/12.3 |

(Continued)

FOREIGN PATENT DOCUMENTS

| CN | 109638718 A | 4/2019 |
|---|---|---|
| JP | 2018-090990 A | 6/2018 |

(Continued)

OTHER PUBLICATIONS

International Search Report for corresponding Application No. PCT/JP2020/045709, mailed Feb. 16, 2021.

(Continued)

*Primary Examiner* — Jessica B Wong
(74) *Attorney, Agent, or Firm* — Renner, Otto, Boisselle & Sklar, LLP

(57) ABSTRACT

It is desirable to provide an aerial vehicle such as a drone for maintenance and management of overhead power lines that is capable of flying for a long period of time without landing by receiving a supply of electric energy from overhead power lines or towers. A magnetic field power generation unit is attached to an aerial vehicle which generates energy using a magnetic field generated by overhead power lines, and the generated energy is used as a power source of the aerial vehicle, by which the aerial vehicle can continue flying for a long period of time. Additionally, by providing a power supply port on a tower supporting overhead power lines, the aerial vehicle can continue flying by charging a battery without landing. Further, by straddling or hanging (Continued)

from overhead power lines during flight, power consumption of the battery can be reduced, and long-term flight can be enabled.

9 Claims, 14 Drawing Sheets

(56) References Cited

U.S. PATENT DOCUMENTS

| | | | |
|---|---|---|---|
| 9,421,869 | B1 | 8/2016 | Ananthanarayanan et al. |
| 9,878,787 | B2* | 1/2018 | Chan ................ B60L 53/126 |
| 10,186,348 | B2* | 1/2019 | Davis ................ H02G 1/02 |
| 10,391,867 | B1 | 8/2019 | Syracuse et al. |
| 11,027,838 | B2* | 6/2021 | Clemente ............ B64D 39/02 |
| 2017/0015414 | A1* | 1/2017 | Chan ................ B64C 39/024 |
| 2017/0015415 | A1 | 1/2017 | Chan et al. |
| 2018/0095468 | A1* | 4/2018 | Yang ................ B64D 27/24 |
| 2020/0391600 | A1 | 12/2020 | Beranger et al. |
| 2021/0276712 | A1 | 9/2021 | Suzuki |

FOREIGN PATENT DOCUMENTS

| | | |
|---|---|---|
| JP | 2019-089361 A | 6/2019 |
| JP | 6603847 B | 11/2019 |
| RU | 2634931 C1 | 11/2017 |
| WO | 2017/094842 A1 | 6/2017 |
| WO | 2019/166724 A1 | 9/2019 |

OTHER PUBLICATIONS

Written Opinion for corresponding Application No. PCT/JP2020/045709, mailed Feb. 16, 2021.

Extended European Search Report corresponding to European Application No. 20900654.3 dated Oct. 27, 2023.

* cited by examiner

… (1)

AERIAL VEHICLE WITH MAGNETIC FIELD POWER GENERATION UNIT AND TOWER INCLUDING CHARGING PORT

TECHNICAL FIELD

The present invention relates to aerial vehicles and towers equipped with charging ports.

BACKGROUND OF THE INVENTION

Utilization of drones or rotorcrafts called multicopters (hereinafter collectively referred to as "aerial vehicles") is drawing attention recently.

These aerial vehicles can easily reach high locations or narrow confined places where humans cannot easily approach, such that they are expected to be utilized at upper areas of towers, inner sides of tunnels, or in underground spaces, where gathering of information and operations are required.

However, these aerial vehicles mainly use batteries as their power sources, such that long-term operations are difficult, and flying ranges and flying times thereof are limited, especially in a low-temperature environment.

Therefore, Patent Document 1 discloses a system in which two rotorcrafts are connected, wherein power is supplied from one rotorcraft to the other rotorcraft using a power supply cable.

Further, Patent Document 2 discloses a device that connects a rotorcraft to a ground etc. using a power supply cable to enable the rotorcraft to be operated for a long period of time.

CITATION LIST

Patent Documents

[Patent Document 1] Publication of Japanese Patent No. 6603847
[Patent Document 2] Publication of WO 2017/094842 A1

SUMMARY OF INVENTION

Technical Problem

However, even by adopting the technique of Patent Document 1, the amount of power that can be supplied from one rotorcraft to another rotorcraft in the air is limited.

Further, by adopting the technique of Patent Document 2, the range of flight of rotorcrafts is limited to the length of the power supply cable, and the presence of the power supply cable may restrict the flight of the rotorcrafts.

Especially in a case where maintenance and inspection operations of a high-voltage power line that exists at a high location is performed using the aerial vehicle, the presence of the power supply cable may become an obstacle to performing safe maintenance and inspection operations.

Means for Solving the Problems

In order to solve the problems described above, one of the representative aerial vehicles of the present invention includes a module provided on the aerial vehicle that generates power from an external magnetic field.

Advantageous Effects of Invention

According to the present invention, the aerial vehicle can continue flying for a long period of time using the energy acquired from an external magnetic field.

Problems, configurations, and effects other than those described above will become apparent from the following descriptions of embodiments.

MODE FOR CARRYING OUT THE INVENTION

Figure 1:
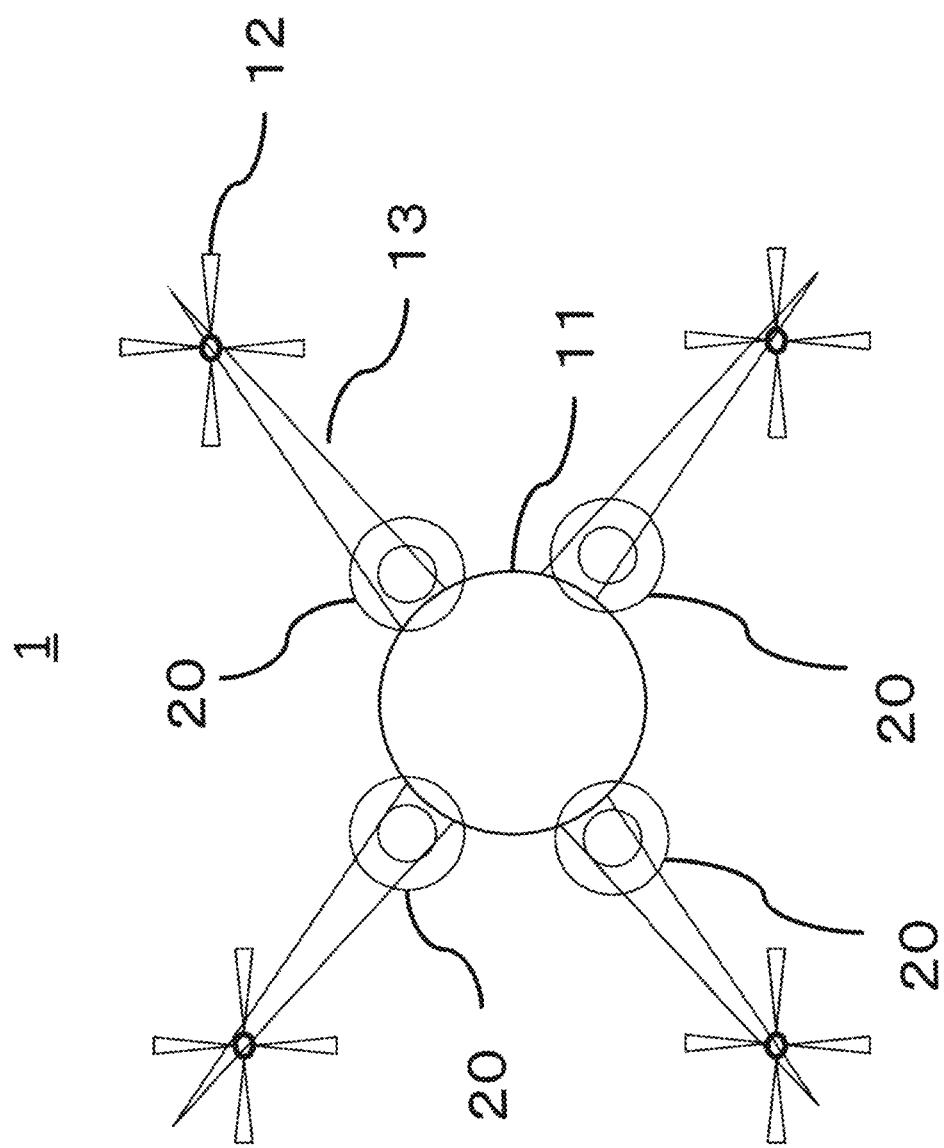
FIG. 1 is a schematic upper view of an aerial vehicle.

Now, an embodiment of the present invention will be described with reference to the drawings. The scope of the present invention will not be limited by the embodiments. The same parts are denoted with the same reference numbers in the drawings.

<Aerial Vehicle>

First, an aerial vehicle according to the present disclosure will be described with reference to FIG. 1. As illustrated in FIG. 1, an aerial vehicle 1 (in the present disclosure, the aerial vehicle is sometimes referred to as a "drone") is equipped with a plurality of arm portions 13 that support a plurality of rotor blades 12, and a center portion 11 to which the arm portion is connected. The center portion 11 of the aerial vehicle 1 is positioned approximately at a center portion within a circle formed by connecting tip portions of the arm portions 13 when the aerial vehicle is viewed from directly above.

In the example of FIG. 1, there are four arm portion 13 and four rotor blades 12, but the number of the arm portions 13 and the number of the rotor blades 12 are not limited thereto. For example, in a case where the aerial vehicle is large, the number of the arm portions 13 and the rotor blades 12 is preferably six or more.

The arm portions 13 can have a straight shape or a bent shape.

According to a first embodiment, a case in which the number of the arm portions 13 and the rotor blades 12 is four will be described as the simplest aerial vehicle.

A control device, a communication device and the like of the aerial vehicle are installed at the center portion 11, and a battery and a GPS antenna are provided in the vicinity of the control device.

Further, the aerial vehicle is equipped with an operation portion (not shown) for carrying out various operations. Typical functions and configurations equipped in the operation portion are listed below, but they are not limited to those listed here.

(1) Shooting, monitoring, investigating, and recording using an information acquisition apparatus such as a camera, a sensor, or a microphone that enables acquisition of an external environment information.

(2) Spraying of fluid, coating, extinguishing of fire, spraying of snow melting agents, and sprinkling of water to animals and plants using a sprayer, a spraying apparatus, or a water discharging apparatus.

(3) Influencing the external environment using a speaker, an odor generator, or an illumination device.

(4) Performing operations or maintenance, moving objects, removing ice and so on using a tool, a robot arm, a rotary brush, and so on.

Further, the aerial vehicle 1 is equipped with a power receiving portion (not shown) in the vicinity of the center portion 11 for receiving power supplied from the magnetic field power generation units 20 or an external source. In the example of FIG. 1, there are four magnetic field power generation units 20, but the number of magnetic field power generation units mounted on the aerial vehicle is not limited.

Figure 2:
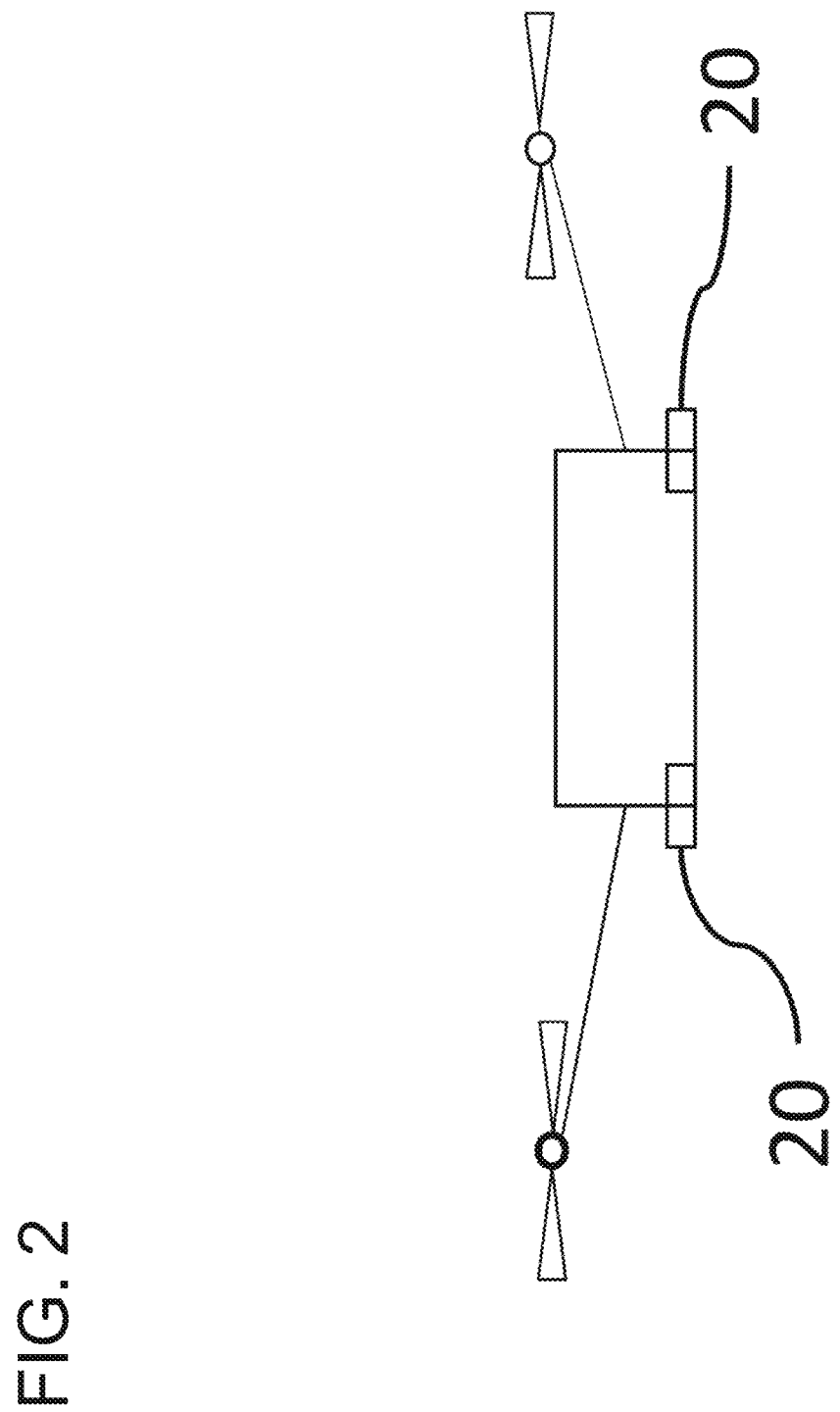
FIG. 2 is a schematic side view of the aerial vehicle.

FIG. 2 is a side view illustrating the aerial vehicle 1 viewed from a lateral direction. The center portion 11 of the aerial vehicle has a disk-like planar shape formed of a flat plate. Four arm portions 13 are extended from the vicinity of the side surface of the center portion 11 toward the outer circumference direction of the circle formed by connecting the tip portions of the arm portions. The four arm portions 13 are arranged such that the arms are bilaterally symmetrical with respect to a cross section that passes through the center portion.

A power unit (not shown) is connected to the rotor blades 12. The rotor blades 12 receive output from the power unit and rotate, and by the rotation of the rotor blades 12, the aerial vehicle 1 can take off from a place of departure, travel horizontally, and land at a target location.

The power unit is not specifically limited as long as it can drive the rotor blades 12, and an electric motor is suitable.

The rotor blades can rotate in a right direction, stop, and rotate in a left direction.

<Magnetic Field Power Generation Unit>

The magnetic field power generation unit for generating power using a magnetic field is equipped with a magnetic field power generation module and a power conversion module.

The magnetic field power generation module is a module that converts the magnetic field generated in the environment into electric energy. A typical example of the environment that generates a large magnetic field is a magnetic field in the vicinity of an overhead power line.

For example, a magnetic flux density of approximately 4300 μT exists at a distance of 20 cm from a power line through which a current of 10000 A flows.

If a Brooks coil having a coil width of c, an inner diameter of 2c, and an outer diameter of 4c is adopted, recoverable power is calculated by the following expression.

$$W = c^5 \times (27\pi^3 \beta f^2 / 16\rho) \times (\mu_0 H)^2 \ [W] \quad \text{[Expression 1]}$$

Figure 3:
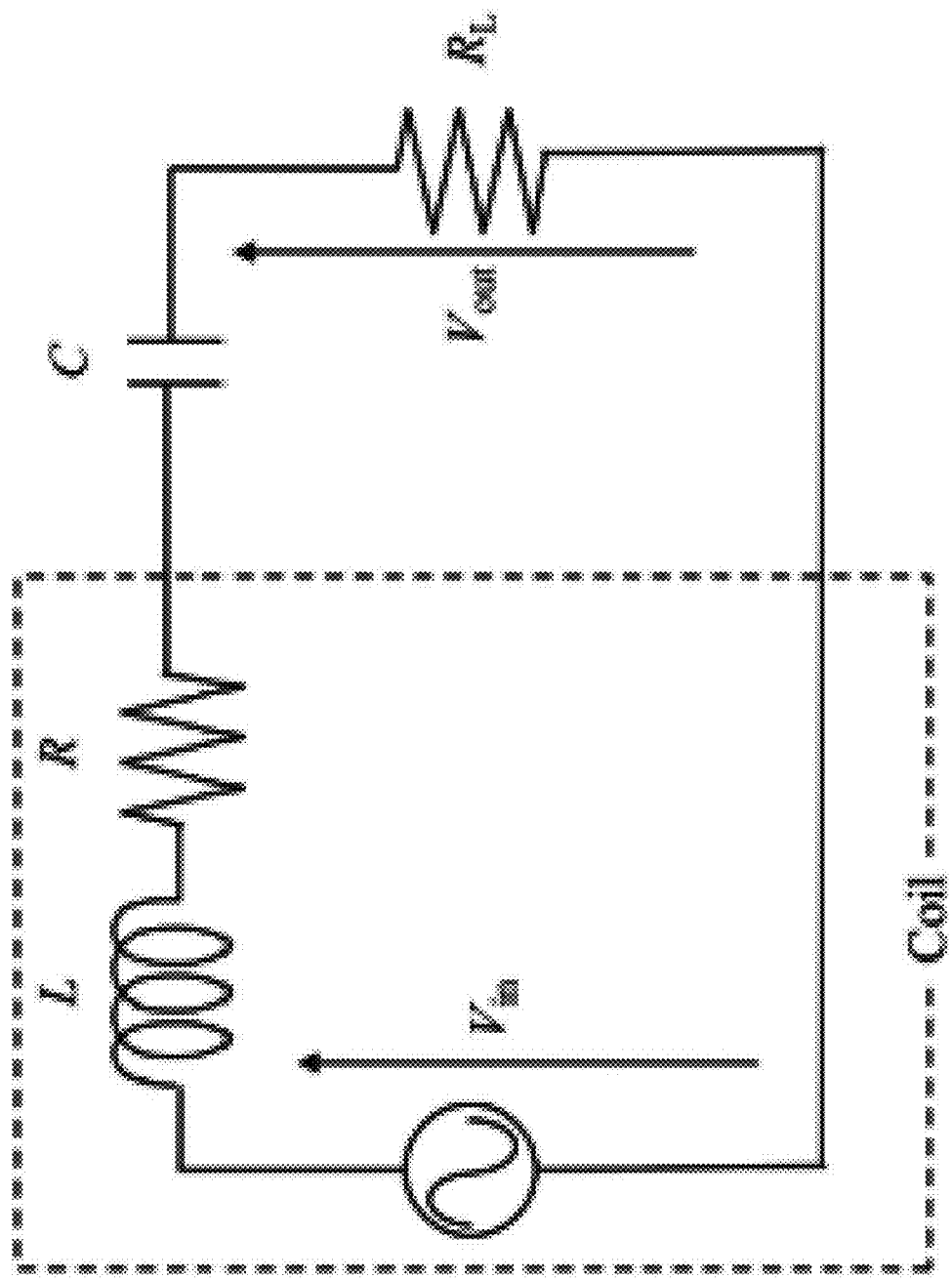
FIG. 3 is an equivalent circuit of a magnetic field power generation module.

In the expression, c [m] represents the coil width, β represents the space factor of the coil, f [Hz] represents frequency, ρ [Ωm] represents the volume resistivity of the winding wire, μO represents the permeability of a vacuum, and H represents the magnetic field, such that μOH [T] represents the average magnetic flux density that interlinks with the coil. The equivalent circuit of such a magnetic field power generation module is as illustrated in FIG. 3.

Figure 4:
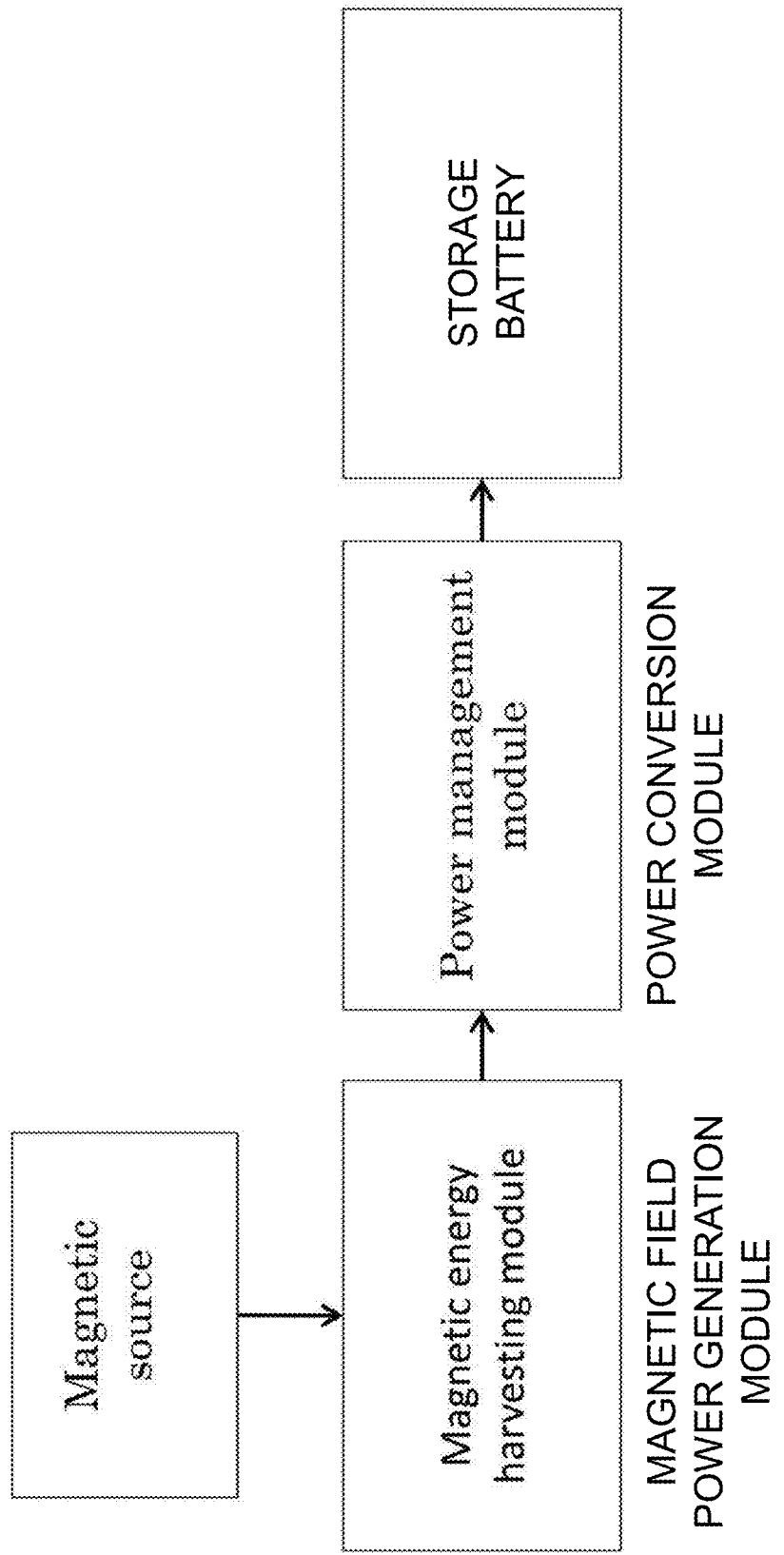
FIG. 4 is a schematic view of a configuration of a magnetic field power generation unit.

By combining the above-mentioned magnetic field power generation module with a power conversion module and a storage battery, the magnetic field power generation unit as illustrated in FIG. 4 can be formed.

According to such a magnetic field power generation unit, the magnetic field existing in the environment can be used to efficiently extract electric energy and utilize the same.

Example 1

Example 1 is an example in which the magnetic field power generation unit described above is attached to an aerial vehicle such as a drone.

Application of aerial vehicles such as drones are being considered for use in various fields, but due to the limitation of battery capacity, sufficient flight time and flight range cannot be obtained.

Specifically, there are attempts to apply drones to confirm the soundness of overhead power lines, but the drones cannot be sufficiently utilized due to restrictions of continuous flying time and the like.

Generally, maintenance and management of overhead power lines are performed by a maintenance worker who carries out inspection operations from the ground using a high magnification telescope or inspection operations carried out by the maintenance worker actually climbing on the tower and hanging from the power line using a dedicated tool. However, regarding overhead power lines such as those placed in mountainous areas where the maintenance worker cannot perform the confirmation operations easily, the inspection operations required a long period of time, such as by having the worker check a slow-motion replay of a video that has been recorded from a helicopter.

Recently, systems have been developed for integrating accumulated video data of overhead power lines and inspection techniques with AI or deep learning techniques, and there are plans to utilize video data captured by drones for the inspection operation of overhead power lines.

However, drones have problems with running out of battery, and currently, this problem has not been overcome to realize the effect of cutting down manpower.

Figure 5:
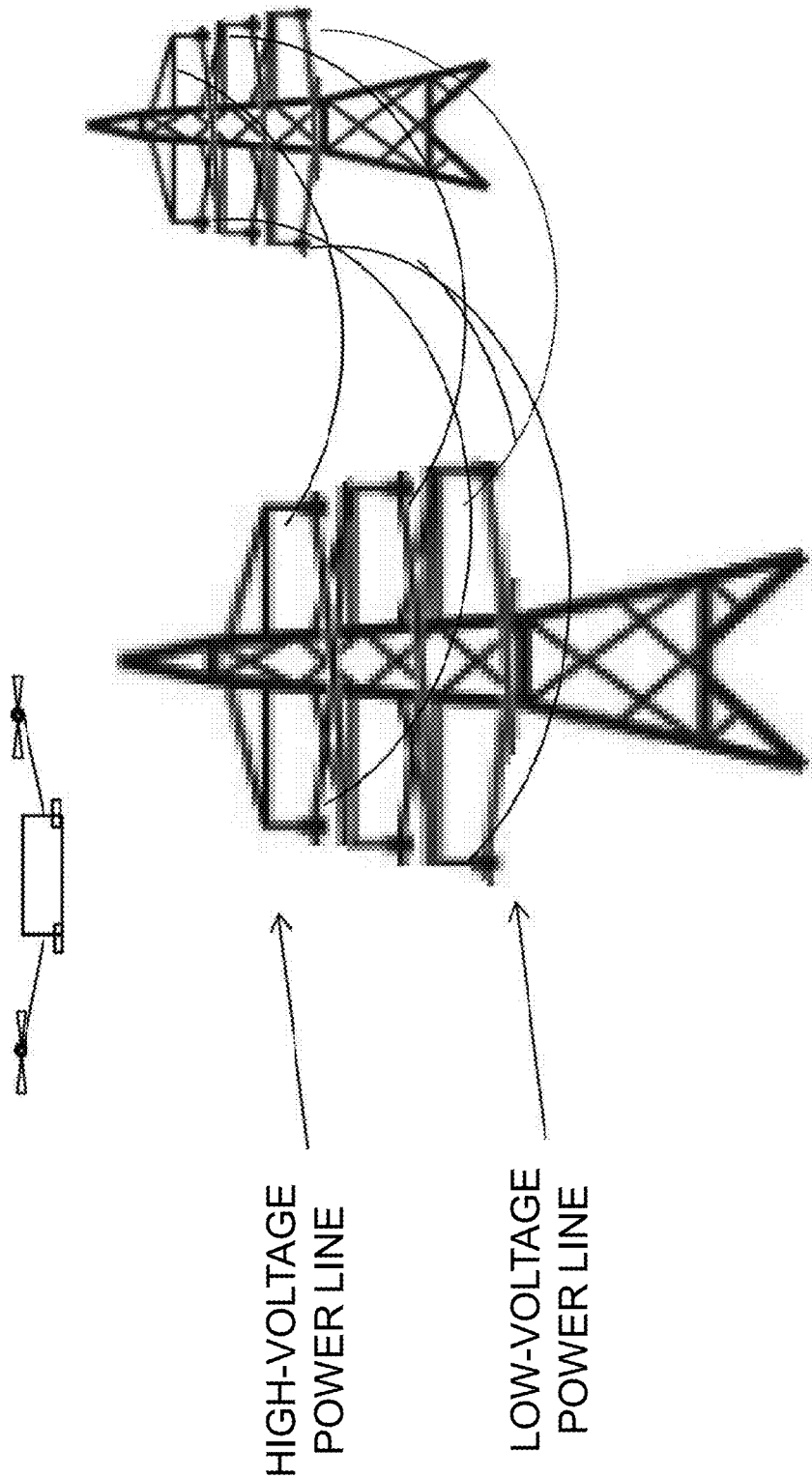
FIG. 5 is a view illustrating an aerial vehicle that flies in a vicinity of an overhead power line and performs maintenance, inspection and other operations of the overhead power line.

Therefore, according to the present example 1, by loading a magnetic field power generation unit on the drone, the drone can fly in the vicinity of the overhead power line as illustrated in FIG. 5 and perform maintenance, inspection, and other operations regarding the overhead power line while simultaneously acquiring electric energy for flight from the magnetic field of the overhead power line. Therefore, the drone can perform maintenance and inspection operations of the overhead power line for a long distance without suffering from the problem of running out of battery as long as it is in the vicinity of the overhead power line.

Countermeasures against icing and snow accretion on overhead power lines mainly involved measures that have been taken by maintenance and inspection workers climbing on towers and performing dangerous maintenance operations, such as installation of snow resistant ring measures to cope with the accretion of snow, or installation of counterweights or correlative spacers to the overhead power line as measures to cope with galloping (significant swinging of the power line) caused by falling of snow from the overhead power line.

In contrast, by using aerial vehicles such as the drone according to the present example, it becomes possible to observe the state of snow accretion and icing promptly, and at the same time, to spray snow melting agents from the aerial vehicle to the overhead power lines or to apply physical stimulation from the drone to the overhead power lines to drop the snow accretion and icing from the lines at an early stage where there is still only a small amount of snow accretion and icing on the overhead power lines, to thereby suppress the harm caused by the falling of snow to a minimum.

Further, since these operations are performed by aerial vehicles such as drones, the maintenance and inspection worker will not be exposed to danger.

Example 2

Example 2 is an example in which, in a state where aerial vehicles such as the drone according to example 1 are not equipped with magnetic field power generation units, power supply ports for drones are provided on towers of overhead power lines, and when an aerial vehicle such as a drone comes close to the drone port on a tower, power is supplied to the aerial vehicle from the tower (the drone receives power).

According to this system, the aerial vehicles such as drones are not required to be equipped with magnetic field power generation units, such that the weight of the aerial vehicles can be reduced, and as a result, the flying range of the aerial vehicles can be increased even further.

Figure 14:
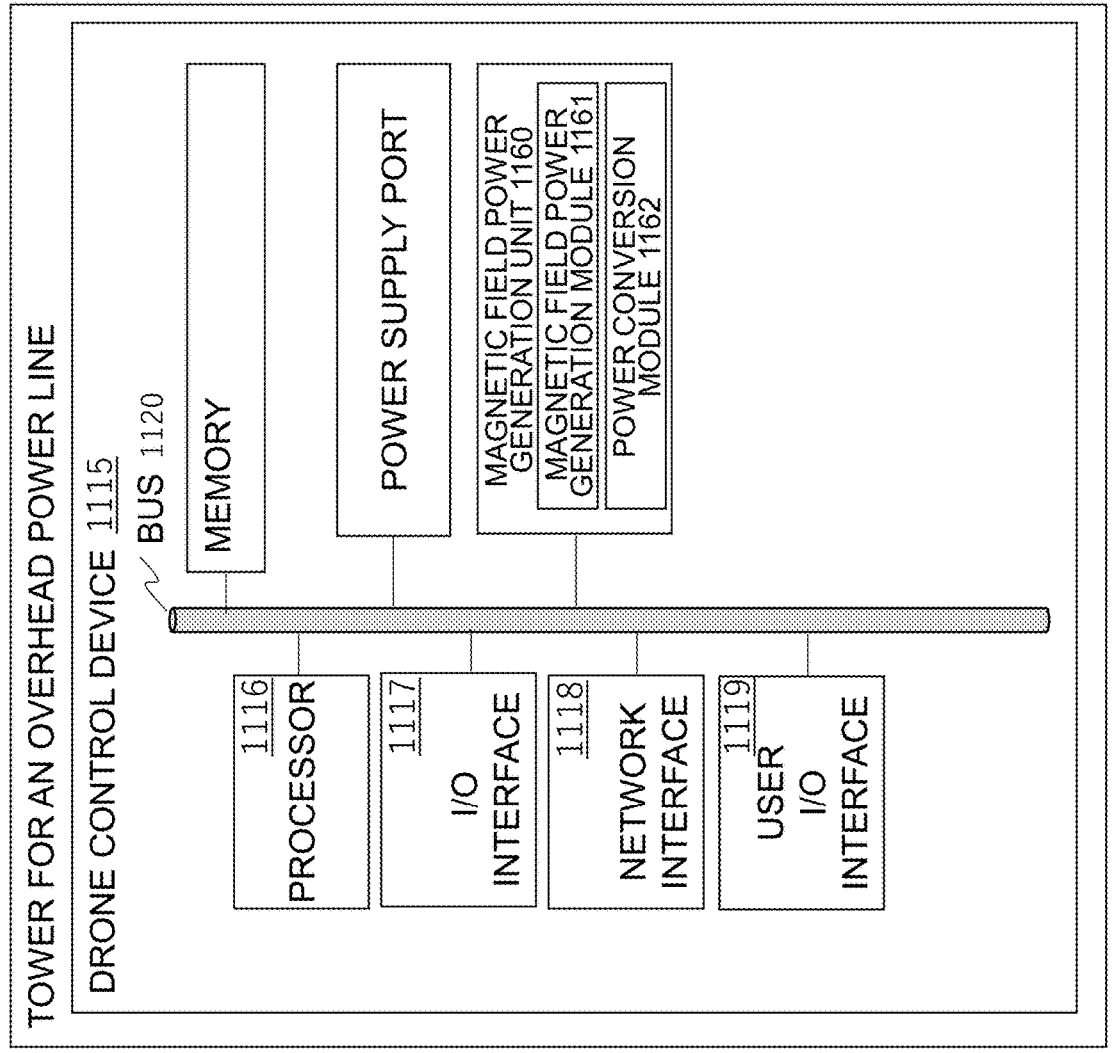
FIG. 14 is a view illustrating another example of a configuration of a control system for an aerial vehicle according to an embodiment of the present invention.

Meanwhile, in the tower, electric energy to be supplied to the aerial vehicle can be acquired directly from the power line as electric energy or acquired via a magnetic field power generation unit (see, e.g., FIG. 14) by using the magnetic field generated by the power line to obtain electric energy.

A coil that has sufficiently large size to generate a magnetic field can be installed on the tower, such that a sufficient function as a power supply port can be ensured.

Various methods can be applied to supply power from the power supply port to the aerial vehicles such as drones. One example of such a method is a noncontact wireless power supply, and various types of known power supply methods can also be adopted as a contact-type power supply method. Of course, a method for performing quick charging can also be adopted.

Example 3

Example 3 is an example in which the power supply port installed in the tower illustrated in example 2 is provided with a function of a marker (not shown) that enables the aerial vehicle such as the drone to land accurately.

Generally, aerial vehicles such as drones adopt a technique in which a human operator controls a control signal using a controller while visually confirming the movement of the vehicle or in which automatic navigation is performed using a GPS function installed in the aerial vehicle and designating way points.

However, positioning accuracy errors may occur due to the GPS, and especially, in a tower located at a high altitude, positional errors related to altitude may occur.

Therefore, it is possible to attach a positioning marker such as an autonomous power beacon device (hereinafter referred to as "beacon") or a laser transmitter to the power supply port serving as the landing port, and when the aerial vehicle approaches the power supply port, the aerial vehicle can be landed on the power supply port using the positioning marker as target.

For example, the beacon is a transmitter that emits specific radio waves (such as radio waves having directivity) from a fixed point to notify its position to the aerial vehicle 1. The beacon (not shown) according to the present invention can include a BLE (Bluetooth (Registered Trademark) Low Energy) beacon, a Wi-Fi beacon, an AP (Access Point) beacon and so on, and any type can be adopted as long as it can emit radio waves.

Further the positioning marker such as the beacon is configured to transmit a positioning signal continuously. The positioning signal can include information indicating the beacon position. Alternatively, the positioning signal can include identification information for uniquely identifying the beacon, and the aerial vehicle 1 having received the positioning signal may specify the position of the beacon that has transmitted the positioning signal by comparing the identification information contained in the positioning signal with a table stored in an internal storage that stores the absolute position of the beacon corresponding to the identification information.

Further, since the beacon according to the present invention is a self-supporting power supply-type beacon, each beacon is equipped with an independent power supply. The self-supporting power supply can be a dry cell or a rechargeable battery, but from the viewpoint of reducing the trouble of replacing batteries or charging batteries of the beacons located at high locations such as a tower, it is preferable to adopt a configuration in which the beacons are provided with a self power generating function.

One example of the power supply equipped with the self power generating function is a silicon dioxide solar power generation system. It is capable of outputting radio waves continuously even without exchanging batteries or being recharged.

As an example of a configuration of such silicon dioxide solar power generation system, for example, a configuration composed of a silicon dioxide solar cell in which two base plates having conductivity are arranged with their conductive surfaces facing each other, wherein at least one of the base plates is formed transparently and constitutes a light incident-side plate, and wherein silicon dioxide and electrolyte are arranged between the two base plates.

In the above description, a case in which a silicon dioxide solar power generation system is used as power supply was described as an example, but the present invention is not limited thereto, and any arbitrary solar battery other than the silicon diode solar power generation system, such as a silicon-based solar battery, a compound-based solar battery, an organic solar battery, a perovskite-type solar battery, or a quantum dot-type solar battery, can be used.

Further, when landing the aerial vehicle on the power supply port, it is also possible to utilize video information taken by the camera equipped on the aerial vehicle.

Specifically, image information of the power supply port prior to landing is acquired by the camera provided on the aerial vehicle, and based on the image information, accurate landing becomes possible. As for the analysis of the image information, an image analyzing technique using AI can be adopted, or when necessary, the image information can be transmitted to a device external to the aerial vehicle and control information for the aerial vehicle can be received from the external device.

Example 4

Example 4 is an example in which a function to receive information collected by an aerial vehicle such as a drone is provided to the power supply port on the tower illustrated in examples 2 or 3.

Various information collected by an aerial vehicle such as a drone can be transmitted externally by wireless transmission, but in mountainous areas, there is a limitation to the distance the wireless transmission output from the aerial vehicle can reach. Therefore, equipment for receiving the information collected by an aerial vehicle such as a drone is provided on the power supply port, and by transmitting the information collected by the anal vehicle to an external device via the power supply port, the collected information can be transmitted to exterior devices reliably.

Example 5

Example 5 is an aerial vehicle such as a drone equipped with a tool that allows the aerial vehicle to slide on a power line by riding on the upper portion of the power line when flying in the vicinity of the overhead power line, in accordance with the situation.

Figure 6:
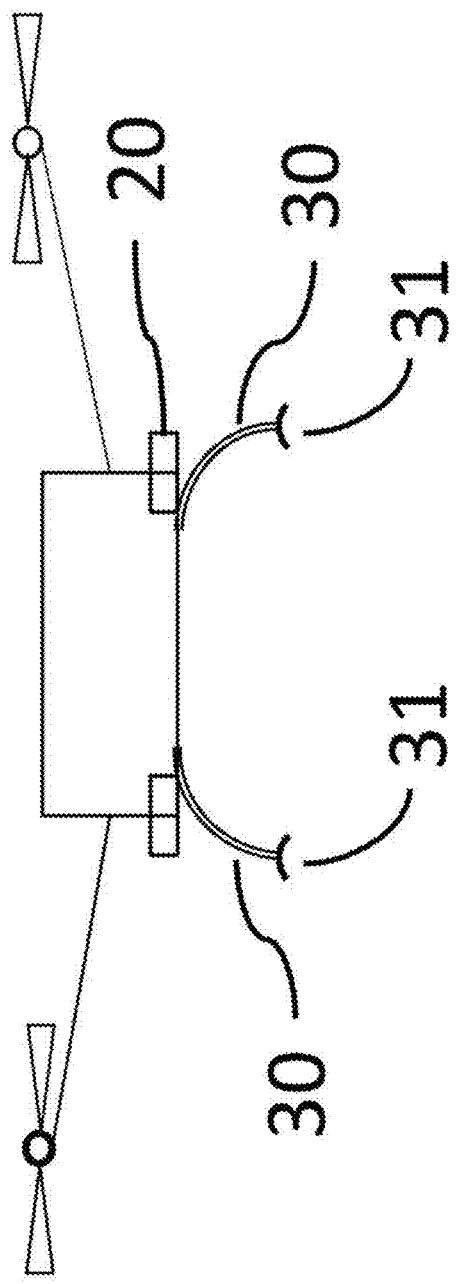
FIG. 6 is a schematic view of the aerial vehicle equipped with a leg portion.

As illustrated in FIG. 6, by providing leg portions 30 downward from the center portion 11 of the drone, the drone can land on an overhead power line. By forming tip portions 31 of the leg portions 30 using insulating bodies corresponding to the shape of the power line, the drone can be landed on two power lines. In such a case, an aerial vehicle such as a drone can slide on the power line by simply driving the aerial vehicle with propulsive force in a lateral direction.

If it is necessary for the propulsive force of the aerial vehicle to be exerted in a substantially horizontal direction, the positions and orientations of the rotor blades 12 and the arm portions 13 can be made adjustable to enable a propulsive force suitable for a sliding movement to be obtained.

By adopting such a sliding movement, it becomes possible to save the electric energy required for the aerial vehicle to move, and the flying range of the aerial vehicle can be increased even further.

If there is an area where a member such as a correlative spacer is installed on the overhead power line that hinders the sliding movement, the aerial vehicle can fly upward and travel in the air, land again on the overhead power line where there is no member that hinders movement, and resume the sliding movement, by which the consumption of electric energy for moving along the power line can be cut down significantly.

Then, in a case where snow accretion and icing exist on the power line, the above-mentioned sliding can be performed to remove the snow and ice attached to the power line.

Example 6

Example 6 is an aerial vehicle such as a drone equipped with a tool that allows the aerial vehicle to slide on the power line by being suspended from the power line when the aerial vehicle flies in the vicinity of the overhead power line, according to the situation.

Figure 7:
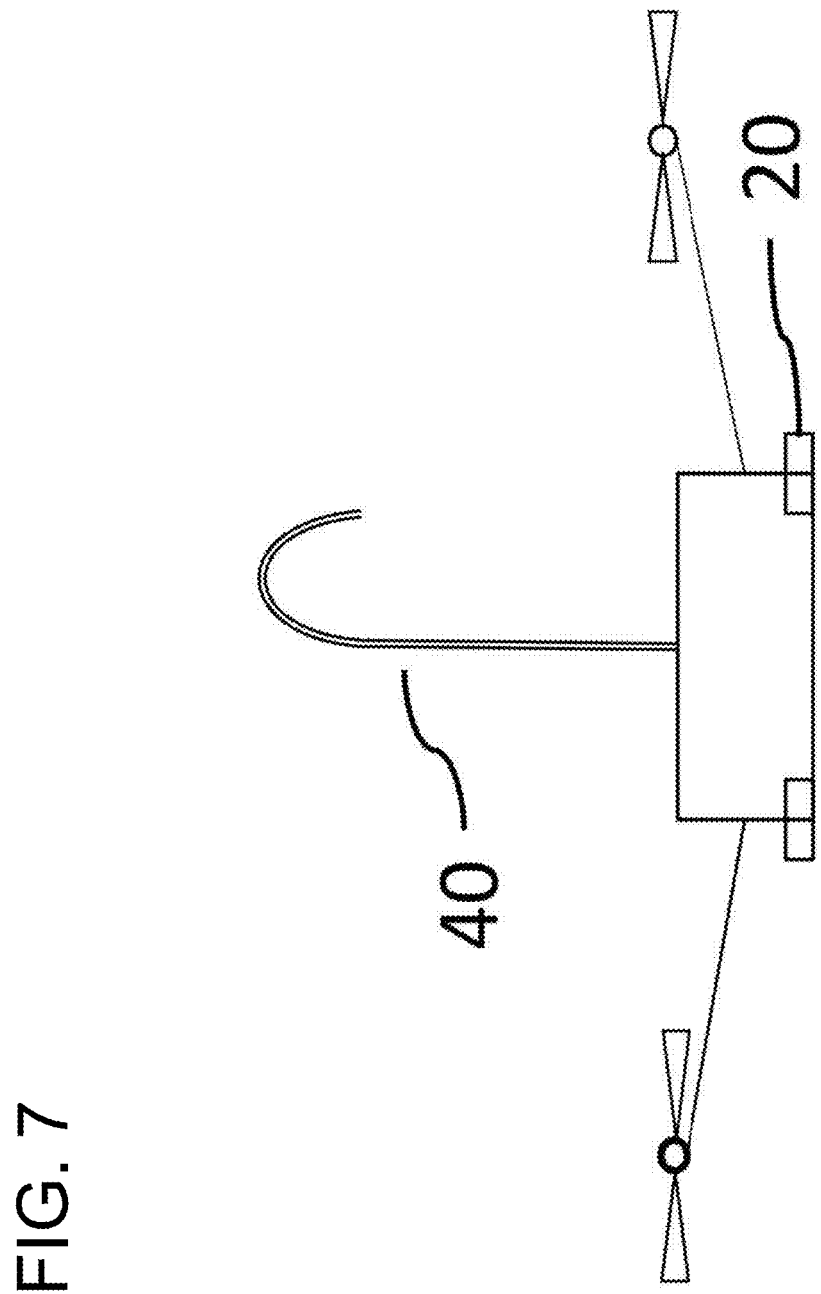
FIG. 7 is a schematic view of the aerial vehicle equipped with a suspending portion.

As illustrated in FIG. 7, by providing a suspending portion 40 upward from the center portion 11 of the drone, the drone can be suspended from the overhead power line. By forming the end of the suspending portion 40 using an insulating material to correspond to the shape of the power line, the drone can be suspended from the power line. In that case, by merely exerting the propulsive force in the lateral direction, the aerial vehicle such as the drone can slide along the power line.

If it is necessary for the propulsive force of the aerial vehicle to be exerted in a substantially horizontal direction, the positions and orientations of the rotor blades 12 and the arm portions 13 can be made adjustable to enable a propulsive force suitable for sliding movement to be obtained, similarly as the case of example 5.

By adopting such a sliding movement, it becomes possible to save the electric energy required for the aerial vehicle to move, and the flying range of the aerial vehicle can be increased even further.

If there is an area where a member such as a correlative spacer is installed in the overhead power line that hinders the sliding movement, the aerial vehicle can fly upward and travel in the air, land again on the overhead power line where there is no member that hinders movement, and resume the sliding movement, by which the consumption of electric energy for moving along the power line can be cut down significantly.

Then, in a case where snow accretion and icing exist on the power line, the above-mentioned sliding can be performed to remove the snow and ice attached to the power line, similarly as the case of example 5.

Example 7

Around power lines, a commercial-frequency electric field that is caused by the transmission voltage of the power line, a commercial-frequency magnetic field that is caused by the current flowing through the power line, and a radiation electromagnetic field that accompanies spark discharges caused at poor contact areas such as the metal fittings of an insulator set on the power line are generated.

Therefore, in order to prevent the electronic circuits such as the control circuits from being adversely affected by the strong electric fields and magnetic fields, especially the radiation electromagnetic fields that accompany discharge phenomena, during the flight of an aerial vehicle such as a drone in the vicinity of overhead power lines, the magnetic field power generation unit provided in the aerial vehicle can be spaced apart from the aerial vehicle, such as by being suspended from the main body of the aerial vehicle. The aerial vehicle can be designed to acquire electric energy from the magnetic field power generation unit at a position spaced apart from the power line.

Example 8

Due to reasons similar to example 7, the power supply port on the tower according to examples 3 and 4 can be provided at a position spaced apart from the power line, and the magnetic field power generation unit can be provided in the vicinity of the power line.

Example 9

Next, with reference to FIGS. 8 to 10, an aerial vehicle according to example 9 of the present invention will be described. Example 9 relates to an aerial vehicle such as a drone equipped with a tool (hereinafter referred to as a slide tool 820) that allows the aerial vehicle to enclose the power line and slide on the power line when the aerial vehicle flies in the vicinity of the overhead power line, according to the situation.

Figure 8:
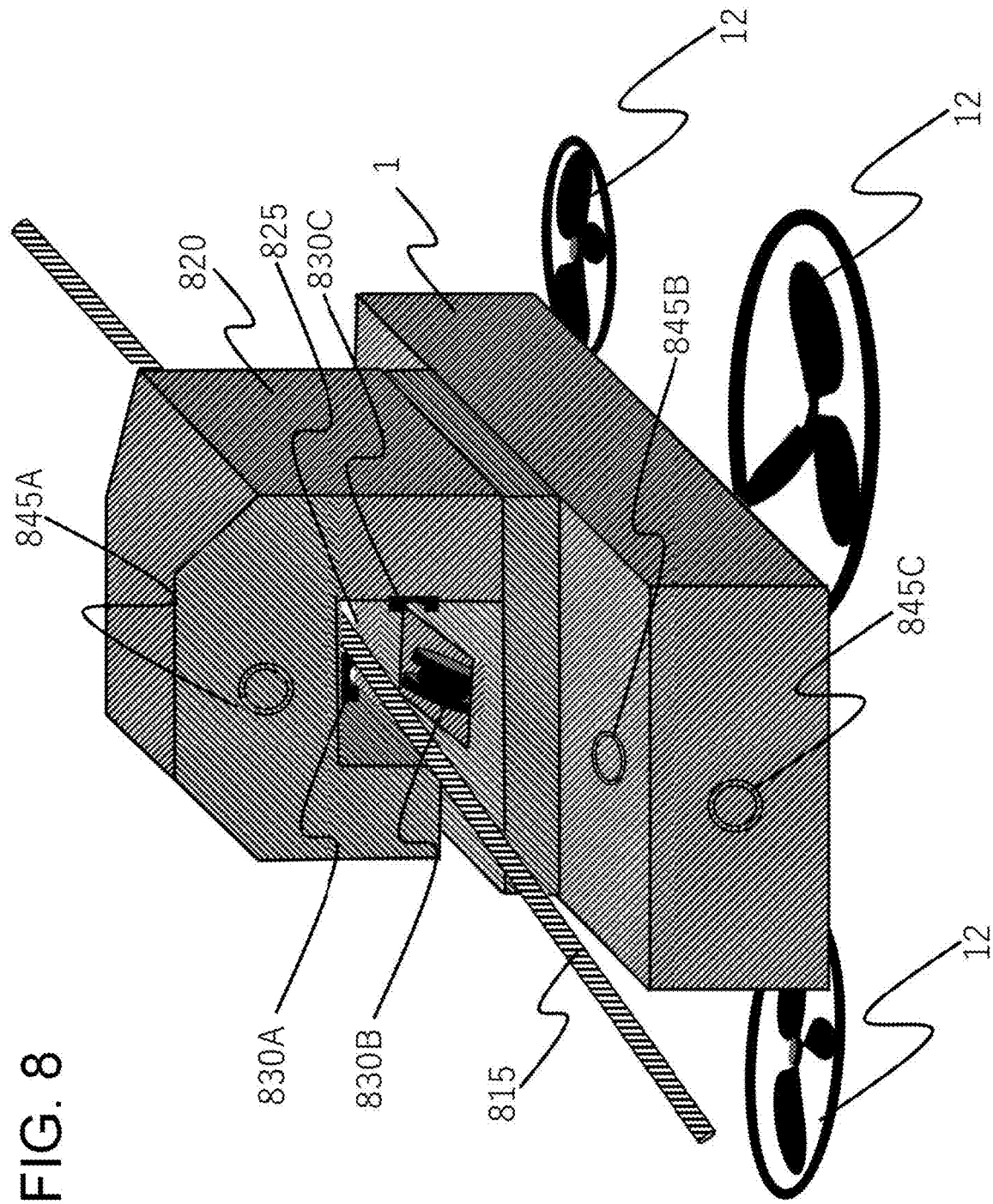
FIG. 8 is a view illustrating a perspective of an aerial vehicle according to an example of the present invention.

FIG. 8 is a perspective view illustrating an aerial vehicle according to example 9 of the present invention.

As illustrated in FIG. 8, a substantially C-shaped slide tool 820 is provided on an upper portion of the main body of the drone 1, by which the drone can be moved stably along an overhead power line 815 (hereinafter also referred to as "power line"). More specifically, the slide tool 820 includes a first surface, a second surface, and a third surface that enclose the power line, and a hole 825 defined by the first surface, the second surface, and the third surface through which the power line is passed (hereinafter also referred to as "through-hole portion"), and on the first surface, the second surface, and the third surface are arranged guide rollers 830A, 830B, and 830C for sliding along the power line. The guide rollers 830A, 830B, and 830C are members for guiding the movement of the drone 1 along the overhead power line 815, and as illustrated in FIG. 8, they can be arranged to hold the power line 815.

Further, the guide rollers 830A, 830B, and 830C can be insulating materials that may contact the power line, and they can be designed to correspond to the shape of the power line 815.

The illustrated example is a configuration of the guide tool 820 including three guide rollers 830A, 830B, and 830C that enclose the power line 815, but the present invention is not limited thereto, and the number and arrangements of the guide rollers can be determined arbitrarily according to the purpose of the drone or the conditions of the power line. For example, as another example, a configuration where a plurality of guide rollers are arranged in a row at predetermined distances or a configuration in which only two guide rollers are arranged (for example, on the upper and lower areas) are also possible.

Moreover, as illustrated in FIG. 8, the drone 1 includes a plurality of sensors 845A, 845B, and 845C. The sensors can be, as described above, cameras. The drone 1 can detect foreign matter (such as snow accretion, icing, and so on) or obstacles (correlative spacers, birds, and branches) on the power line using these sensors 845A, 845B, and 845C. The drone 1 can take actions to cope with foreign matter and obstacles detected by the sensors 845A, 845B, and 845C.

As an example, if an area where a member is located that hinders the sliding motion such as a correlative spacer is detected, the drone 1 may fly away from the power line in the air, land again on the overhead power line where there is no member that hinders movement, and resume the sliding movement, such that the consumption of electric energy for moving along the power line can be cut down significantly.

As another example, in a case where snow accretion and icing exist on the power line 815, the drone 1 can spray snow melting agents and the like to remove the snow and ice attached to the power line.

Further, as illustrated in FIG. 8, the drone 1 can include a plurality of rotor blades 12. The drone 1 can slide along the power line 815 by propulsive force exerted by the rotor blades 12 such that the weight of the drone 1 is not applied on the power line 815, thereby making it possible to reduce the load applied to the power line 815.

Further, although not shown in FIG. 8, the drone 1 can adopt a magnetic field power generation module for converting the magnetic field generated by the power line 815 into electric energy and a power conversion module that converts the alternating current generated by the magnetic field power generation module into direct current, as described above. As described later, the magnetic field power generation module can be a magnetic core coil or a Rogowski coil. Further, these coils can be arranged to satisfy a predetermined distance criterion (such as a distance most suitable for electromagnetic induction) from the power line 815.

As described above, by using the slide tool 820 that encloses the power line 815, it becomes possible for an aerial vehicle such as a drone to maintain a distance that enables efficient electromagnetic induction using the magnetic field generated from the power line 815. Therefore, the drone can move stably along the power line 815 and perform maintenance and inspection operations of the power line 815 utilizing the energy acquired from the magnetic field of the power line 815.

Next, an internal configuration of a slide tool according to example 9 of the present invention will be described with reference to FIG. 9. FIG. 9 is a view illustrating a cross-sectional view of an aerial vehicle according to example 9.

As described above, the slide tool 820 is arranged on an upper portion of the drone 1 according to the example of the present invention, and the slide tool 820 is mainly composed of a first surface 901, a second surface 902, and a third surface 903 enclosing the power line 815. Further, as illustrated in FIG. 9, the first surface 901 and the second surface 902 oppose each other, and they are connected to the third surface 903. The first surface 901, the second surface 902, and the third surface 903 define a through hole 825 through which the power line 815 is passed. Further, the above-mentioned guide rollers 830A, 830B, and 830C are arranged on the first surface 901, the second surface 902, and the third surface 903.

Figure 9:
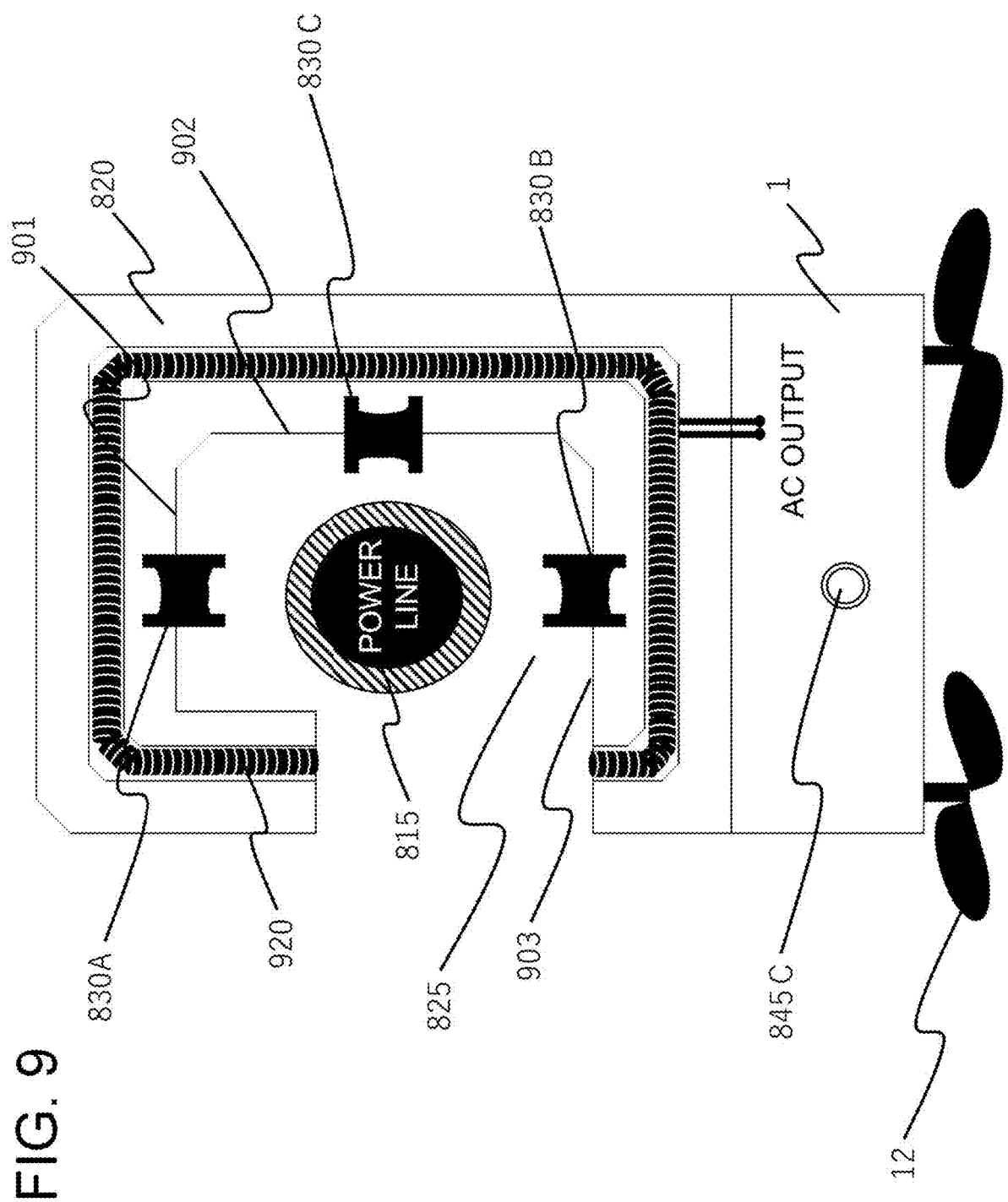
FIG. 9 is a cross-sectional view of an aerial vehicle according to an example of the present invention.

Further, according to example 9, as illustrated in FIG. 9, a power supply coil 920 is arranged on an inner side of the slide tool 820 as the above-mentioned magnetic field power generation module. The power supply coil 920 is for converting the magnetic field generated by overhead power line into electric energy. The power supply coil 920 is configured as a winding wire formed of an electrical conductor, wherein a material having ferromagnetism or ferrimagnetism, or air, is used as core, and a copper wire is wound around the core to form a magnetic core coil or a Rogowski coil, or it can be an air core coil or a high frequency coil. The copper wire wound around the core can be wound according to any arbitrary method, such as a honeycomb winding method or a spider winding method.

As illustrated in FIG. 9, the power supply coil 920 can be arranged on the inner side of the first surface 901, the second surface 902, and the third surface 903 that constitute the slide tool 820. The power supply coil 920 can be arranged to satisfy a predetermined distance criteria (such as a distance most suitable for electromagnetic induction) from the power line 815. Further, the length, the diameter, the number of windings, the material and the like of the power supply coil 920 can be determined arbitrarily according to the characteristics (quantity and frequency) of the current flowing through the power line.

The power that has been generated through magnetic induction by the power supply coil 920 can be output as an alternating current. Further, as described above, the drone 1 according to example 9 of the present invention can be equipped with a power conversion module (not shown in FIG. 10) for converting the alternating current generated by the magnetic field power generation module (that is, by the power supply coil 920) into direct current. The direct current converted by the power conversion module can be supplied to the motor for the rotor blades 12 of the drone 1 and used as power for driving the drone 1, for example.

Next, an internal configuration of the slide tool 820 according to example 9 of the present invention will be described with reference to FIG. 10. FIG. 10 is a view illustrating a side view of the aerial vehicle according to example 9 of the present invention.

Figure 10:
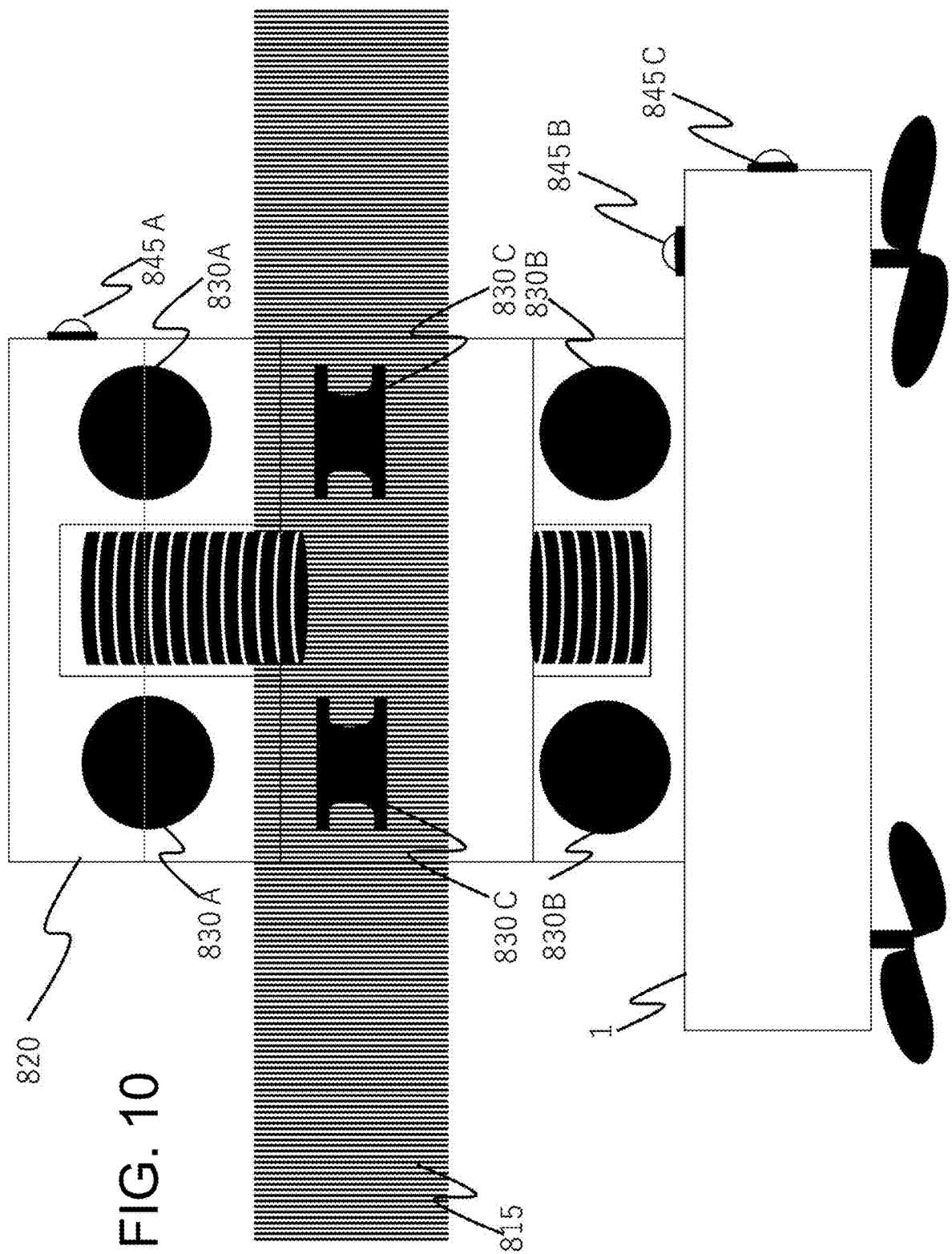
FIG. 10 is a side view of an aerial vehicle according to an example of the present invention.

The configuration of the slide tool 820 illustrated in FIG. 10 is substantially similar to the slide tool 820 described with reference to FIG. 9, such that similar descriptions are omitted for convenience of description.

In the above description, a configuration was described as an example in which one guide roller was arranged on each of the first surface, the second surface, and the third surface that constitute the slide tool 820, but the present invention is not limited to this example, and as illustrated in FIG. 10, a plurality of guide rollers can be arranged on the first surface, the second surface, and the third surface that constitute the slide tool 820. Thereby, the sliding operation of the drone 1 on the power line 815 is stabilized, and the drone 1 is less likely to be affected by wind and the like.

Example 10

Next, an aerial vehicle according to example 10 of the present invention will be described with reference to FIG. 11. Example 10 relates to an aerial vehicle such as a drone, wherein the aerial vehicle is equipped with a tool that encloses the power line and that enables the aerial vehicle to slide along the power line according to circumstances when flying in the vicinity of the overhead power line.

Example 9 illustrates the configuration of a drone that is designed to enclose one overhead power line 815 at a time and slide along the power line using the power from the magnetic field generated in the overhead power line, but the present invention is not limited to this example, and it is also applicable to a case where the overhead power line 815 adopts a multiple conductor system.

A multiple conductor system refers to a configuration in which the power lines constituting the power line 815 is not composed of one conductor but of two or more conductors, the number of which is 2, 4, 6, 8, or another number.

Figure 11:
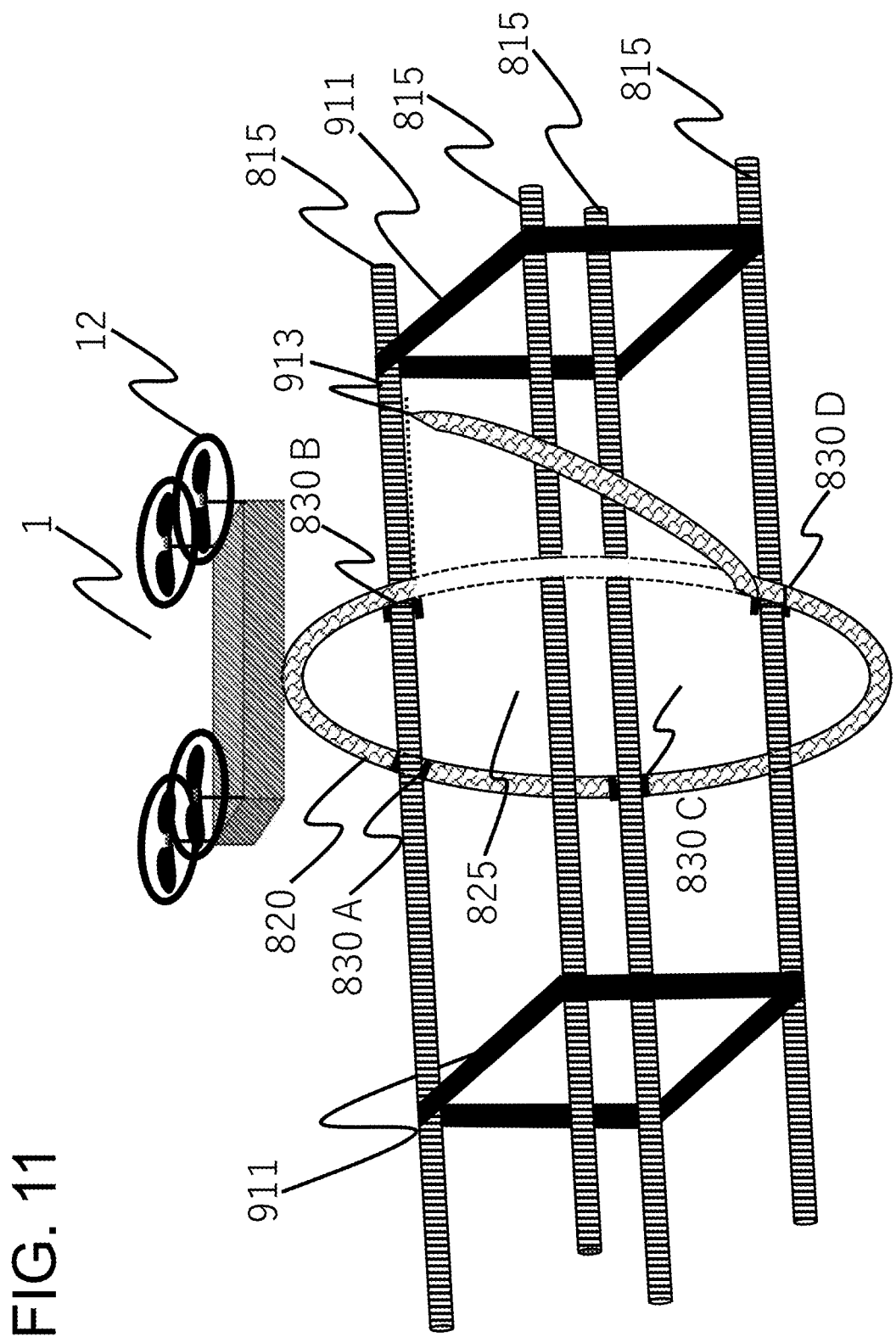
FIG. 11 is a perspective view of an aerial vehicle according to example 10 of the present invention.

In a case where the overhead power line 815 is composed of a multiple conductor system, each conductor is maintained to be spaced apart by a certain distance from other members using a member such as a spacer 911 illustrated in FIG. 11.

In a case where the overhead power line 815 is composed of such a multiple conductor system, the drone 1 according to the example of the present invention can be equipped with a tool that is capable of collectively enclosing the multiple conductors that constitute the overhead power line 815 to allow the drone to slide.

Now, a configuration of the drone 1 according to example 10 of the present invention that is capable of enclosing multiple lines and allows the drone 1 to slide along the power line using the power from the magnetic field generated by the overhead power line 815 will be described.

FIG. 11 is a perspective view of the aerial vehicle according to example 10 of the present invention. The drone 1 according to example 10 differs from the drone according to example 9 in that it is provided with a ring-type slide tool 820 that is configured to open and close and collectively enclose a plurality of conductors that constitute the overhead power line 815. According to such configuration, the present invention is also applicable to a case where the multiple conductor system mentioned above is adopted, and more power can be generated compared to the drone described in example 9.

As illustrated in FIG. 11, a ring-type slide tool 820 is provided at a lower part of the main body of the drone 1.

Similar to the configuration described with reference to example 9, the ring-type slide tool 820 of the drone 1 according to example 10 includes the hole 825 through which the power line 815 is passed (hereinafter referred to as "through-hole portion"), wherein a through-hole portion 825 of the drone 1 according to example 10 differs from the through-hole portion of the drone 1 according to example 9 in that it can collectively enclose a plurality of power lines 815.

The diameter of the ring-type slide tool 820 can be set arbitrarily according to the distance between respective power lines or the number of power lines 815, and the number is not specifically limited.

Further, as described above, the ring-type slide tool 820 is configured be able to open and close. More specifically, as illustrated in FIG. 11, the ring-type slide tool 820 includes an open/close portion 913, and the open/close portion 913 is movable between a closed state forming the ring, which is illustrated by dotted lines, and an open state in which the ring is substantially C-shaped. The state of the open/close portion 913 can be controlled, for example, by an operation portion (such as an operation portion 1170 illustrated in FIG. 13) of the drone 1.

The drone 1 can set the open/close portion 913 of the slide tool 820 to the open state to thereby enclose the plurality of conductors constituting the overhead power line 815 by the through-hole portion 25 of the slide tool 820 or to release the power lines 815 enclosed by the through-hole portion 25 to fly away from the power line 815. Further, the drone 1 can set the open/close portion 913 of the slide tool 820 to the closed state to utilize the energy obtained from the magnetic field of the power line 815 to move stably along the power line 815 and perform maintenance and inspection operations of the power line 815.

Further, as illustrated in FIG. 11, guide rollers 830A, 830B, 830C, and 830D are arranged on an inner circumferential surface of the slide tool 820 for sliding along the power line 815. The guide rollers 830A, 830B, 830C, and 830D are members for guiding the movement of the drone 1 along the overhead power line 815, and as illustrated in FIG. 11, they can be arranged arbitrarily to correspond to the distance between the respective power lines 815 constituting the multiple conductor system.

Further, the guide rollers 830A, 830B, 830C, and 830D can be insulating members that can be in contact with the power lines, and they can be formed to correspond to the shape of the power lines 815.

The configuration of the slide tool 820 including the four guide rollers 830A, 830B, 830C, and 830D has been illustrated as an example, but the present invention is not limited thereto, and the number and arrangement of the guide rollers can be determined arbitrarily according to the aim of the drone or the condition of the power lines.

Further, although not shown in FIG. 11, the drone 1 can adopt a magnetic field power generation module for converting the magnetic field generated by the power line 815 into electric energy and a power conversion module for converting the alternating current generated by the magnetic field power generation module to direct current, as described above. The magnetic field power generation module can be a magnetic core coil or a Rogowski coil, which is arranged inside (on the entire circumference or on a portion of) the ring-type slide tool 820. Further, these coils can be arranged to satisfy a predetermined distance criterion (such as a distance most suitable for electromagnetic induction) from the power line 815.

Although not illustrated in FIG. 11, similar to the configuration according to the example described above, the drone 1 according to example 10 includes a plurality of sensors. The sensors can be cameras, for example. The drone 1 can detect foreign matter (such as snow accretion and icing) and obstacles (correlative spacers, birds, and branches) attached to the power line using these sensors. Further, the drone 1 can perform operations to cope with foreign matter and obstacles that have been detected by the sensors 845A, 845B, and 845C.

As an example, if an area is detected where a member that hinders sliding motion such as a correlative spacer is located, the drone 1 opens the open/close portion 913, flies away from the power line in the air, lands again on the overhead power line where there is no member that hinders movement, closes the open/close portion 913, and resumes the sliding movement, such that the consumption of electric energy for moving along the power line can be cut down significantly. As another example, if an area is detected where a member that hinders sliding motion such a correlative spacer is located, the drone 1 can drive the guide rollers 830A, 830B, 830C, and 830D to ride over the corresponding area.

As mentioned above, by using the ring-type slide tool 820 for collectively enclosing a plurality of power lines 815, the drone can move stably along the power line 815 while utilizing the energy obtained from the magnetic field of the power line 815 and perform maintenance and inspection operations of the power line 815.

Figure 12:
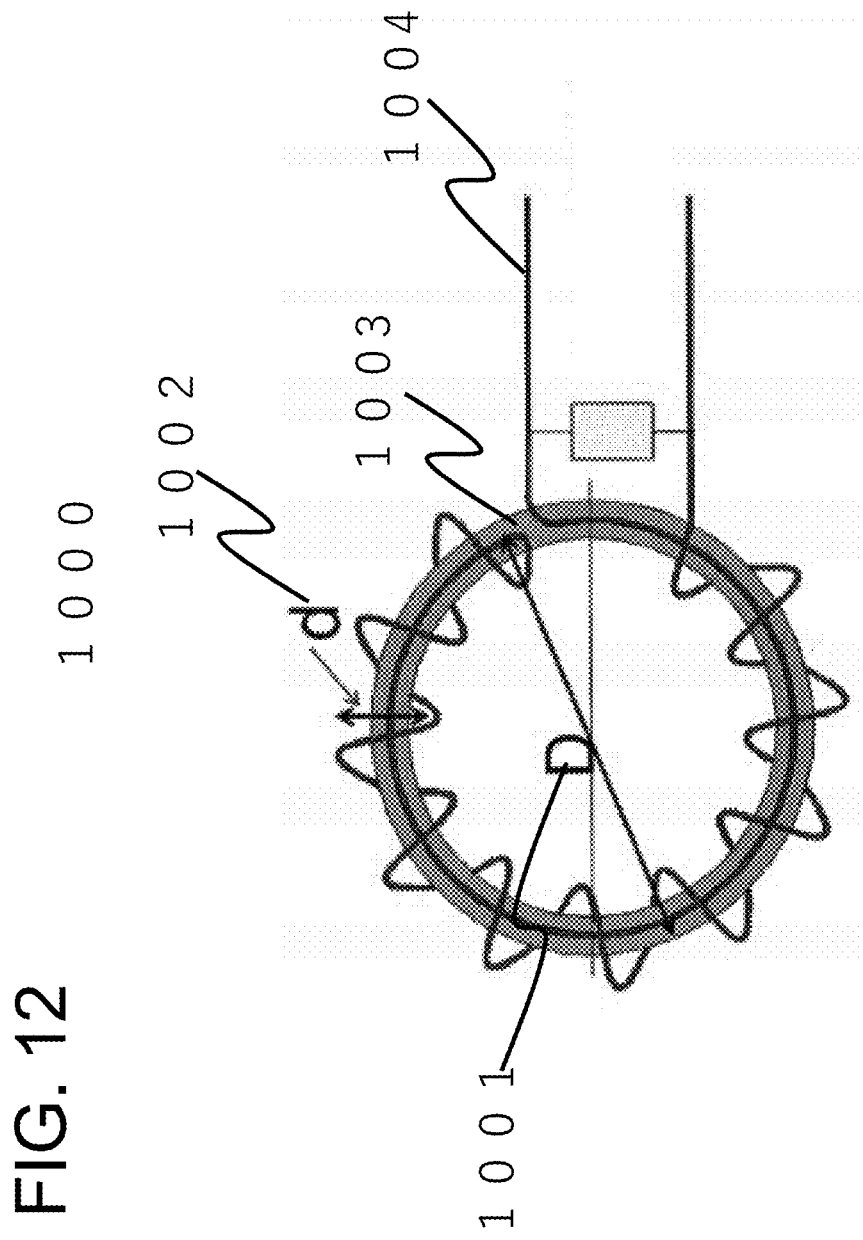
FIG. 12 is a view illustrating an example in which a Rogowski coil is adopted as a magnetic field power generation module according to an example of the present invention.

In FIG. 12, the power line of the multiple conductor system including four power lines 815 has been illustrated as an example, but the present invention is not limited thereto, and the number of power lines can be selected arbitrarily. Further, the diameter of the ring-type slide tool 820 can be set arbitrarily according to the distance between the power lines and the number of the power lines 815.

Example where Rogowski Coil is Adopted as Magnetic Field Power Generation Module Next, with reference to FIG. 12, an example in which a Rogowski coil is adopted as the magnetic field power generation module according to the present invention will be described.

FIG. 12 is a view illustrating one example in which a Rogowski coil 1000 is adopted as a magnetic field power generation module according to an example of the present invention.

As described above, a Rogowski coil can be used as an example of the magnetic field power generation module according to the example of the present invention. The Rogowski coil is a coil in which induced voltage is generated by the magnetic field created by alternating current flowing through the conductor such as the power line interlinking with the air core coil. As illustrated in FIG. 12, the Rogowski coil 1000 is composed of a toroidal coil 1003 and an external circuit 1004 for outputting the generated current.

The electromotive force E (t) of the Rogowski coil 1000 is calculated by the following expression 2.

$$E(t) = \frac{\mu\mu_0 N d^2}{4D} \frac{dI_0}{dt}$$ [Expression 2]

In the expression, μ represents the magnetoconductance of the core of the Rogowski coil 1000, $\mu_0$ represents the magnetic constant, N represents the number of turns of the coil, d represents the diameter of a copper wire wound around the coil, D represents the external form of the coil, and $I_0$ represents the current that flows through a conductor (such as a power line).

As an example, in a case where a current of 1000 A flows through a power line with a diameter of approximately 35 mm, the diameter of the Rogowski coil is 50 cm (which is the size of the conductor of the multiple conductor system described with reference to example 10), the coil core is made of ferrite with a diameter of 2 cm, and the diameter of the copper wire wound around the ferrite is 1 mm, at least an output of approximately 10 W or more can be obtained.

In order to further increase the output being obtained, the number of turns of the copper wire of the coil can be increased or the material of the core can be changed to a material having light weight and high permeability, by which a power sufficient to have the drone according to the example of the present invention move in a self-propelled manner can be obtained.

<Configuration of Control System of Aerial Vehicle>

Next, with reference to FIG. 13, a configuration of a control system of an aerial vehicle according to the present embodiment will be described with reference to FIG. 13.

Figure 13:
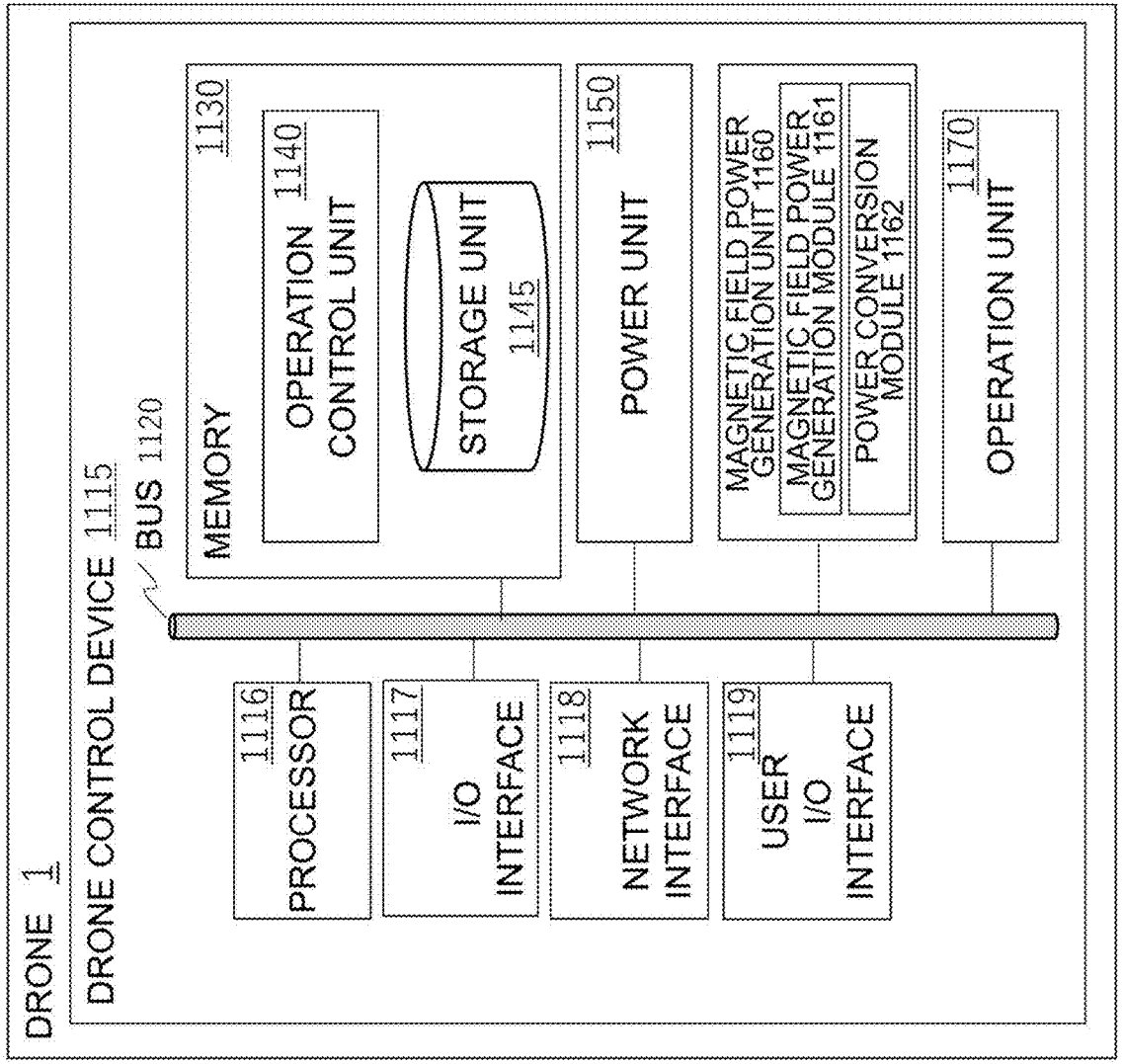
FIG. 13 is a view illustrating one example of a configuration of a control system for an aerial vehicle according to an embodiment of the present invention.

FIG. 13 is a view illustrating one example of a control system configuration 1100 of the drone 1 according to an embodiment of the present invention.

As illustrated in FIG. 13, the drone 1 according to the embodiments of the present invention includes a drone control device 1115 that controls the drone 1. The drone control device 1115 can be implemented as a microcomputer or an SoC (System on a Chip) installed on the drone 1.

The drone control device 1115 includes a processor 1116 for executing a command stored in a memory 1130, an I/O interface 1117 for controlling internal/external communication of signals with a device such as a beacon, a network interface 1118 for controlling the communication performed via a communication network such as a GPS, a user I/O interface 1119 for receiving signals from a remote controller at a remote location, a memory 1130 including a storage unit 1145 for storing commands and various information for implementing the functions of an operation control unit 1140 for controlling the operation of the drone 1, a power unit 1150, a magnetic field power generation unit 1160, an operation portion 1170, and a bus 1120 for controlling bidirectional communication of these components.

The operation control unit 1140 is, for example, a function unit that controls the operation of the drone 1 based on route information that specifies a movement route in an environment in which the drone 1 flies and an operation information that specifies a work operation in the environment. The route information and the operation information can be stored in the storage unit 1145, for example.

Further, as described above, the drone 1 includes the power unit 1150. The power unit 1150 supplies electric power to the rotor blades of the aerial vehicle to rotate the same. By having the rotor blades rotate, the drone 1 can take off from the place of departure, move horizontally, and land at a target location. The power unit 1150 is not specifically limited as long as it is a means capable of moving the rotor blades, but an electric motor is suitable.

The magnetic field power generation unit 1160 is a function unit for generating electric power using a magnetic field generated in the power line and the like. As described above, the magnetic field power generation unit 1160 includes a magnetic field power generation module 1161 and a power conversion module 1162.

The magnetic field power generation module 1161 is a module that converts the magnetic field generated in the environment into electric energy. Further, the power conversion module 1162 is a module that converts the alternating current generated by the magnetic field power generation module 1161 into direct current and supplies the same to the above-described power unit 1150 and the like.

The operation portion 1170 is equipped with a function unit for enabling the drone 1 to execute various operations. The typical functions and configurations provided in the operation portion 1170 are, for example, (1) shooting, monitoring, investigating, and recording by an information acquisition apparatus capable of acquiring external environment information, such as a camera, a sensor, or a microphone, (2) spraying of liquid, coating, extinguishing of fire, spraying of snow melting agent, and sprinkling of water to animals and plants by a sprayer, a spraying apparatus, or a water discharging apparatus, (3) influencing the external environment using a speaker, an odor generator, or an illumination device, and (4) performing operations or maintenance, moving objects, removing ice and so on using a tool, a robot arm, a rotary brush and so on.

The present invention is not limited to the examples described above, and various modifications are included in the scope of the invention. For example, according to the above-mentioned example, a magnetic field power generation unit is designed to convert the magnetic field generated by the overhead power line into electric energy, but the magnetic field power generation unit can convert the magnetic field generated in any environment into electric energy. That is, any magnetic field generated in the environment, such as a transformer apparatus, not limited to the overhead power line, can be utilized, and the present invention is not limited to overhead power lines.

Further, a portion of a configuration of a certain example can be replaced with a configuration of another embodiment, and a configuration of a certain example can be added to the configuration of another embodiment. Moreover, a portion of another configuration can be added to, deleted from, or replaced with a part of a configuration of each example. For example, the aerial vehicle and the tower can utilize various power generation sources other than the magnetic field power generation unit, such as a photovoltaic system, a wind energy conversion system, or a temperature difference power conversion device.

Further, in a case where a strong electric field or a magnetic field may have a harmful effect on the control unit or the like of the aerial vehicle, it is possible to provide a shielding member that suppresses the effect of electric fields and magnetic fields to necessary areas.

Further, a portion or all of the respective configurations, functions, means and so on described above can be replaced with equivalent means.

REFERENCE SIGNS LIST

1: aerial vehicle
11: center portion
12: rotor blade
13: arm portion
20: magnetic field power generation unit
30: leg portion
31: tip portion
40: suspending portion

The invention claimed is:

1. An aerial vehicle comprising:
a magnetic field power generation unit; and
an operation portion configured to control a sensor for acquiring external environment information;
wherein:
the magnetic field power generation unit includes a magnetic field power generation module and a power conversion module;
the magnetic field power generation module is configured to convert a magnetic field generated by an overhead power line into electric energy;
the power conversion module is configured to convert an alternating current generated by the magnetic field power generation module into a direct current;
in a state where an obstacle on the overhead power line is detected by the sensor, the aerial vehicle departs from the overhead power line temporarily, and after passing the obstacle, returns to the overhead power line and resumes a sliding operation on the overhead power line; and
in a state where foreign matter attached to the overhead power line is detected by the sensor, the aerial vehicle cleans the foreign matter using a cleaning means based on a type of the foreign matter.

2. The aerial vehicle according to claim 1, further comprising a power reception means for receiving electric energy from a power supply port on a tower for an overhead powerline.

3. The aerial vehicle according to claim 2, wherein the power reception means is arranged at a distance spaced apart from a main body of the aerial vehicle.

4. The aerial vehicle according to claim 1, wherein the aerial vehicle further comprises a slidable tool for sliding on the overhead power line.

5. The aerial vehicle according to claim 4, wherein the slidable tool comprises:
a first surface, a second surface, and a third surface; and
a through-hole portion that is defined by the first surface, the second surface, and the third surface,
wherein:
the first surface and the second surface oppose one another;
the third surface connects the first surface and the second surface; and
a guide roller configured to slide on the overhead power line is arranged at least on the first surface.

6. The aerial vehicle according to claim 5, wherein the guide roller configured to slide on the overhead power line is arranged on each of the first surface, the second surface, and the third surface.

7. The aerial vehicle according to claim 1, wherein the aerial vehicle further comprises an operation control unit configured to control an operation of the aerial vehicle based on route information determined in advance.

8. An aerial vehicle power supply system comprising;
a tower for an overhead power line; and
an aerial vehicle,
wherein:

the tower includes a magnetic field power generation unit and a power supply port through which electric energy obtained from the overhead power line is supplied to the aerial vehicle;

the power supply port is configured to receive supply of electric energy from the magnetic field power generation unit;

the magnetic field power generation unit includes a magnetic field power generation module and a power generation module;

the magnetic field power generation module is configured to convert a magnetic field generated in the overhead power line into electric energy;

the power conversion module is configured to convert an alternating current generated by the magnetic field power generation module into a direct current and supply the direct current as electric energy to the power supply port or a storage battery connected to the power supply port; and the aerial vehicle includes:

a power reception means for a receiving electric energy from a power supply port on a tower; and an operation portion configured to control a sensor for acquiring external environment information;

wherein:

in a state where an obstacle on the overhead power line is detected by the sensor, the aerial vehicle departs from the overhead power line temporarily, and after passing the obstacle, returns to the overhead power line and resumes a sliding operation on the overhead power line; and in a state where foreign matter attached to the overhead power line is detected by the sensor, the aerial vehicle cleans the foreign matter using a cleaning means based on a type of the foreign matter.

9. The aerial vehicle according to claim 4, wherein the slidable tool comprises:

a shape which opens and closes so as to enclose the overhead power line; and a guide roller arranged on at least a portion of the slidable tool for sliding on the overhead power line.

* * * * *